United States Patent
Kim

(10) Patent No.: US 11,719,330 B1
(45) Date of Patent: Aug. 8, 2023

(54) APPARATUS FOR CONTROLLING TRANSMISSION OF VEHICLE AND METHOD THEREOF

(71) Applicants: Hyundai Motor Company, Seoul (KR); Kia Corporation, Seoul (KR)

(72) Inventor: Jin Sung Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/857,809

(22) Filed: Jul. 5, 2022

(30) Foreign Application Priority Data

Apr. 12, 2022 (KR) .................. 10-2022-0045058

(51) Int. Cl.
*F16H 61/02* (2006.01)
*F16H 59/14* (2006.01)
*F16H 59/46* (2006.01)
*F16H 59/36* (2006.01)
*F16H 61/00* (2006.01)

(52) U.S. Cl.
CPC ....... *F16H 61/0213* (2013.01); *F16H 59/141* (2013.01); *F16H 59/46* (2013.01); *F16H 2059/366* (2013.01); *F16H 2059/465* (2013.01); *F16H 2061/0087* (2013.01); *F16H 2061/0093* (2013.01)

(58) Field of Classification Search
CPC .. F16H 59/141; F16H 59/46; F16H 2059/366; F16H 2059/465; F16H 61/0213; F16H 2061/0087; F16H 2061/0093; B60W 10/06; B60W 10/113
See application file for complete search history.

(56) References Cited

U.S. PATENT DOCUMENTS

| 6,360,154 B1 * | 3/2002 | Krenn ............... B60W 10/11 701/87 |
| 10,807,601 B1 * | 10/2020 | Cho ..................... B60W 10/06 |
| 2015/0276051 A1 * | 10/2015 | Tsuge .................. F16H 61/0437 701/59 |
| 2020/0309206 A1 * | 10/2020 | Kim ..................... B60W 10/02 |
| 2023/0045819 A1 | 2/2023 | Kim |

FOREIGN PATENT DOCUMENTS

KR   10-2023-0024493   2/2023

* cited by examiner

*Primary Examiner* — Edwin A Young
(74) *Attorney, Agent, or Firm* — Morgan, Lewis & Bockius LLP

(57) ABSTRACT

An apparatus and a method for controlling a transmission of a vehicle includes storage that stores a dual clutch transmission (DCT) dynamic model and a machine learning-based Gaussian process (GP) model, and a controller configured for determining a first engine torque used for optimal shifting according to the DCT dynamic model, determines an engine torque compensation value according to the machine learning-based GP model, and controls a shifting of the vehicle according to the first engine torque compensated by the engine torque compensation value.

18 Claims, 8 Drawing Sheets

APPARATUS FOR CONTROLLING TRANSMISSION OF VEHICLE AND METHOD THEREOF

CROSS-REFERENCE TO RELATED APPLICATION

The present application claims priority to Korean Patent Application No. 10-2022-0045058, filed on Apr. 12, 2022, the entire contents of which is incorporated herein for all purposes by this reference.

BACKGROUND OF THE PRESENT DISCLOSURE

Field of the Present Disclosure

The present disclosure relates to a technology for controlling a transmission of a vehicle based on a dual clutch transmission (DCT) dynamic model (physical model) and a Gaussian process (GP) model supporting the DCT dynamic model.

Description of Related Art

In general, a vehicle provided with DCT is configured to receive power from an engine through two clutches, change the gear ratio, and then provide the power to driving wheels. The two clutches are respectively connected to separate input shafts in the DCT to implement shifting stages assigned to each input shaft. The shifting stages assigned to each input shaft are usually divided into odd and even units among a series of shifting stages, so that one input shaft is configured to implement only the odd unit and the other input shaft is configured to implement only the even unit.

Upshift refers to shifting to an upper shifting stage among a series of shifting stages. In the case of DCT, the upshifting to stage K, which is a shifting stage assigned to one input shaft, while driving refers to the shifting to stage (K+1) assigned to another input shaft.

In the instant case, the clutch connected to the input shaft implementing stage K, which is the current shifting stage, must reduce the torque input from the engine while being released, and the clutch connected to the input shaft implementing stage (K+1), which is a target shifting stage, must increase the input from engine while being engaged.

When shifting, the clutch released while reducing the torque input from the engine as described above is called the 'release-side clutch', and the input shaft connected thereto is called the 'release-side input shaft'. Furthermore, the clutch which is engaged while increasing the torque input from the engine is called the 'engagement-side clutch', where the input shaft connected thereto is called the 'engagement-side input shaft' or 'target shifting stage input shaft'.

According to the related art, because the shifting of the vehicle is controlled in a proportional integral derivation (PID) scheme using a lookup table, it is impossible to organically control the engine torque and the clutch torque, so that it is impossible to minimize the jerk generated in the shifting process.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus and a method for controlling a transmission of a vehicle configured for minimizing a jerk generated during a shift process of the vehicle to improve shift quality by detecting an engine torque used for optimal shifting based on a dual clutch transmission (DCT) dynamic model, predicting an engine torque compensation value based on a Gaussian process (GP) model, and controlling the shifting of the vehicle based on the engine torque compensated by the engine torque compensation value.

The technical objects of the present disclosure are not limited to the above-mentioned one, and the other unmentioned technical objects and advantages will become apparent from the following description. Also, it may be easily understood that the objects and advantages of the present disclosure may be realized by the units and combinations thereof recited in the claims.

According to an aspect of the present disclosure, an apparatus of controlling a transmission of a vehicle includes storage that stores a dual clutch transmission (DCT) dynamic model and a machine learning-based Gaussian process (GP) model, and a controller configured for determining a first engine torque used for optimal shifting according to the DCT dynamic model, determines an engine torque compensation value according to the machine learning-based GP model, and controls a shifting of the vehicle according to the first engine torque compensated by the engine torque compensation value.

According to an exemplary embodiment of the present disclosure, the controller may input a second engine torque and an engagement-side clutch torque to the DCT dynamic model, and obtain the first engine torque, an engine speed, and a rotation speed of an engagement-side clutch as outputs of the DCT dynamic model.

According to an exemplary embodiment of the present disclosure, the controller may be configured to determine a slip speed of the engagement-side clutch according to a difference between the engine speed and an engagement-side clutch speed.

According to an exemplary embodiment of the present disclosure, the controller may input the engine speed and the slip speed of the engagement-side clutch to the machine learning-based GP model, and obtain the engine torque compensation value as an output of the machine learning-based GP model.

According to an exemplary embodiment of the present disclosure, the machine learning-based GP model may output the engine torque compensation value for synchronizing the engine speed with the rotation speed of the engagement-side clutch.

According to an exemplary embodiment of the present disclosure, the controller may learn the machine learning-based GP model based on the second engine torque, the engine speed, and the slip speed of the engagement-side clutch.

According to an exemplary embodiment of the present disclosure, the controller may compensate for the first engine torque by use of the engine torque compensation value in an inertia phase.

According to an exemplary embodiment of the present disclosure, the DCT dynamic model may include a mathematically defined nominal model.

According to an exemplary embodiment of the present disclosure, the machine learning-based GP model may include a mean function which is of a zero-mean type, a covariance function which is a squared exponential automatic relevance determination, and uncertainty propagation which is a Taylor approximation.

According to an aspect of the present disclosure, a method of controlling a transmission of a vehicle includes storing, by storage, a dual clutch transmission (DCT) dynamic model and a machine learning-based Gaussian process (GP) model, determining, by a controller, a first engine torque used for optimal shifting according to the DCT dynamic model, determining, by the controller, an engine torque compensation value according to the machine learning-based GP model, and controlling, by the controller, a shifting of the vehicle according to the first engine torque compensated by the engine torque compensation value.

According to an exemplary embodiment of the present disclosure, the determining of the first engine torque may include inputting a second engine torque and an engagement-side clutch torque to the DCT dynamic model, and obtaining the first engine torque, an engine speed, and a rotation speed of an engagement-side clutch as outputs of the DCT dynamic model.

According to an exemplary embodiment of the present disclosure, the determining of the first engine torque may include determining a slip speed of the engagement-side clutch according to a difference between the engine speed and an engagement-side clutch speed.

According to an exemplary embodiment of the present disclosure, the determining of the engine torque compensation value may include inputting the engine speed and the slip speed of the engagement-side clutch to the machine learning-based GP model, and obtaining the engine torque compensation value as an output of the machine learning-based GP model.

According to an exemplary embodiment of the present disclosure, the method may further include learning, by the controller, the machine learning-based GP model based on the second engine torque, the engine speed, and the slip speed of the engagement-side clutch.

According to an exemplary embodiment of the present disclosure, the controlling of the shifting may include compensating for the first engine torque by use of the engine torque compensation value in an inertia phase.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
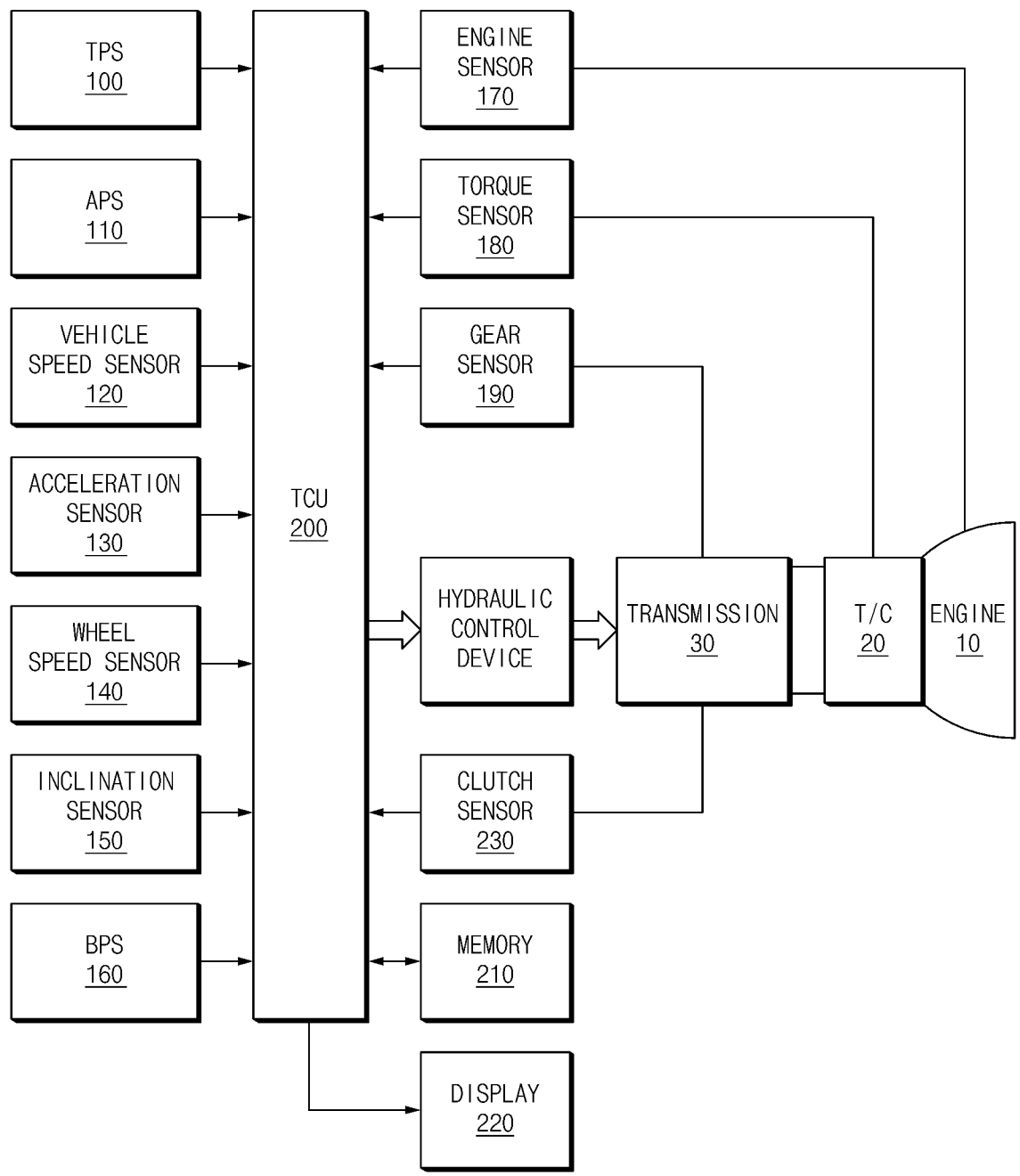
FIG. 1 is a block diagram illustrating a system for controlling a transmission of a vehicle to which an exemplary embodiment of the present disclosure is applied.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Furthermore, in describing the exemplary embodiment of the present disclosure, a detailed description of the related known configuration or function will be omitted when it is determined that it interferes with the understanding of the exemplary embodiment of the present disclosure.

In describing the components of the exemplary embodiment of the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which the present disclosure belongs. It will be further understood that terms, such as those defined in commonly used dictionaries, should be interpreted as having a meaning which is consistent with their meaning in the context of the relevant art and will not be interpreted in an idealized or overly formal sense unless expressly so defined herein.

FIG. 1 is a block diagram illustrating a system for controlling a transmission of a vehicle to which an exemplary embodiment of the present disclosure is applied. Although the case where the power source is an engine 10 will be referred to as an exemplary embodiment of the present disclosure, it is obvious that the same may be applied even when the power source is a motor.

As shown in FIG. 1, a system for controlling a transmission of a vehicle to which an exemplary embodiment of the present disclosure is applied may include a throttle position sensor (TPS) 100, an accelerator position sensor (APS) 110, a vehicle speed sensor 120, an acceleration sensor 130, a wheel speed sensor 140, an inclination sensor 150, a brake position sensor (BPS) 160, an engine sensor 170, a torque sensor 180, a gear sensor 190, a transmission control unit (TCU) 200, a memory 210, a display 220, and a clutch sensor 230.

Regarding each component, the TPS 100 may detect a throttle position corresponding to an opening amount of the throttle valve of the engine 10 and generate a throttle position detection signal corresponding to the throttle position. The APS 110 may detect an accelerator position according to the driver's operation state of the accelerator pedal, and generate an accelerator position detection signal accordingly. The vehicle speed sensor 120 may detect a vehicle speed according to the driving of the vehicle and generate a vehicle speed detection signal accordingly. The acceleration sensor 130 may detect a change in acceleration in the longitudinal direction to generate a longitudinal acceleration detection signal corresponding to the change in acceleration while the vehicle moves, or may detect a change in acceleration in the lateral direction to generate a lateral acceleration detection signal while the vehicle moves. The wheel speed sensor 140 may detect a wheel speed to generate a wheel speed detection signal corresponding to the wheel speed while the vehicle moves. In the instant case, the wheel speed may include a speed of a front left (FL) wheel, a speed of a front right (FR) wheel, a speed of a rear left (RL) wheel, and a speed of a rear right (RR) wheel. The wheel speed detection signal may be one of the FL wheel speed, the FR wheel speed, the RL wheel speed, and the RR wheel speed, or may be the average of the FL, FR, RL and RR wheel speeds. The inclination sensor 150 may detect the inclination of a vehicle body to generate an inclination detection signal corresponding to the inclination of the vehicle body while the vehicle moves on an inclined road (or a curved road). The brake position sensor 160 may detect an operation state of a brake pedal by a driver to generate a brake position detection signal corresponding to the operation state of the brake pedal. The engine sensor 170 may include an engine revolutions per minute (rpm) sensor which is configured to detect a engine revolutions per minute (RPM) to generate an RPM detection signal (speed signal) as the engine 10 is driven, and an engine torque sensor which is configured to detect a torque (hereinafter, referred to as an engine torque) as the engine 10 is driven. The torque sensor 180 may detect a rotation torque of a torque converter 20 coupled between the engine 10 and a transmission 30 to generate a torque detection signal corresponding to the rotation torque. The gear sensor 190 may detect a gear stage operation state to generate a gear stage detection signal corresponding to the gear stage operation state as the gear shifting of the transmission 30 is performed. In the instant case, the transmission 30 may be implemented as a dual clutch transmission (DCT).

Meanwhile, to control the shift of the vehicle, the TCU 200 may receive the throttle position detection signal from the TPS 100, the accelerator position detection signal from the APS 110, the vehicle speed detection signal from the vehicle speed sensor 120, the acceleration detection signal from the acceleration sensor 130, the wheel speed detection signal from the wheel speed sensor 140, the inclination detection signal from the inclination sensor 150, the brake position detection signal from the BPS 160, the RPM detection signal from the engine sensor 170, the torque detection signal from the torque sensor 180, and the gear stage detection signal from the gear sensor 190.

The TCU 200 may collect data for understanding the road state (inclination, curvature, and the like) and the driving state of the vehicle through the detection signals from the sensors, and may analyze the collected data and classify information. In the instant case, the driving information data analyzed through the collected data may include the opening amount of the throttle valve, the position of the accelerator, the current gear engagement state of the transmission, the vehicle speed, the acceleration, the engine RPM, the average vehicle speed, the difference in the number of wheel revolutions, the vehicle inclination, the operating cycle of the brake, the torque demand degree of the engine, the curvature of the road, the inclination of the road, and the like. The TCU 200 may perform a gear shifting (up/down shift) corresponding to a shift pattern preset based on the analyzed driving information data.

The memory 210 may store a shift pattern by a manual shift command from the driver, a shift pattern by a shift protection command, a shift pattern of a class defined by shifting in a class mode, and the driving information data corresponding to the shift pattern of the class. The display 220 may display the shift progress state by application of the current shift pattern under control of the TCU 200 to enable the driver to confirm the shift progress state. The clutch sensor 230 may include a speed sensor which is configured to detect the rotation speed of a clutch (e.g., an engagement-side clutch) provided in the transmission 30 to generates a speed detection signal corresponding to the rotation speed, and a torque sensor which is configured to detect the torque of a clutch (e.g., an engagement-side clutch) provided in the transmission 30 to generate a torque detection signal corresponding to the torque.

Figure 2:
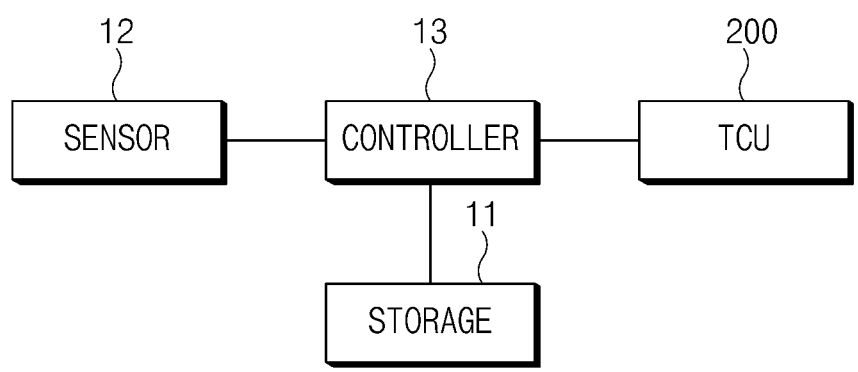
FIG. 2 is a block diagram illustrating an apparatus of controlling a transmission of a vehicle according to an exemplary embodiment of the present disclosure.

FIG. 2 is a block diagram illustrating an apparatus of controlling a transmission of a vehicle according to an exemplary embodiment of the present disclosure.

As shown in FIG. 2, an apparatus of controlling a transmission of a vehicle according to an exemplary embodiment of the present disclosure may include storage 11, a sensor 12, and a controller 13. In the instant case, in accordance with a scheme of implementing an apparatus of controlling a transmission of a vehicle according to an exemplary embodiment of the present disclosure, components may be combined with each other to be implemented as one, or some components may be omitted. Furthermore, the controller 13 may directly perform machine learning of the machine learning-based GP model stored in the storage 11.

Regarding each component, the storage 11 may store various logic, algorithms and programs required in the processes of detecting an engine torque used for optimal shifting based on a DCT dynamic model, predicting an engine torque compensation value based on a GP model, and controlling the shifting of the vehicle based on the engine torque compensated by the engine torque compensation value.

The storage 11 may store a DCT dynamic model and a machine learning-based GP model. As an exemplary embodiment of the present disclosure, the DCT dynamic model is a mathematically defined physical model (nominal model) as shown in FIG. 3A, and the machine learning-based GP model is shown in FIG. 3B.

Figure 3A:
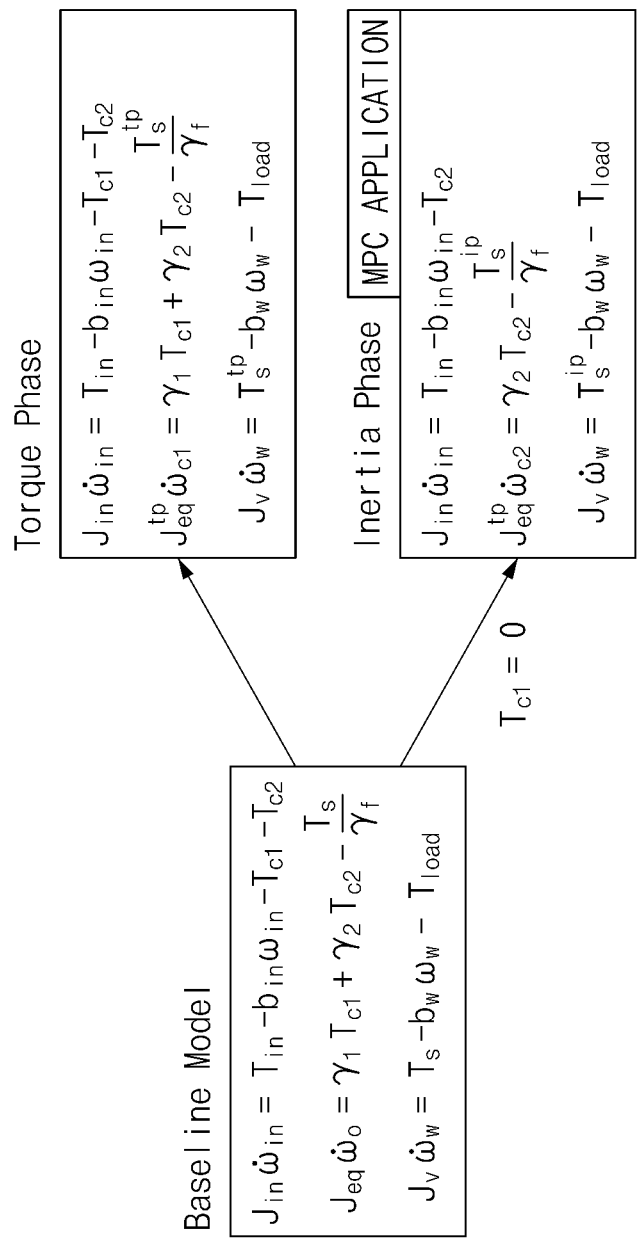
FIG. 3A is a view exemplarily illustrating a DCT dynamic model provided in an apparatus of controlling a transmission of a vehicle according to an exemplary embodiment of the present disclosure.
Figure 3B:
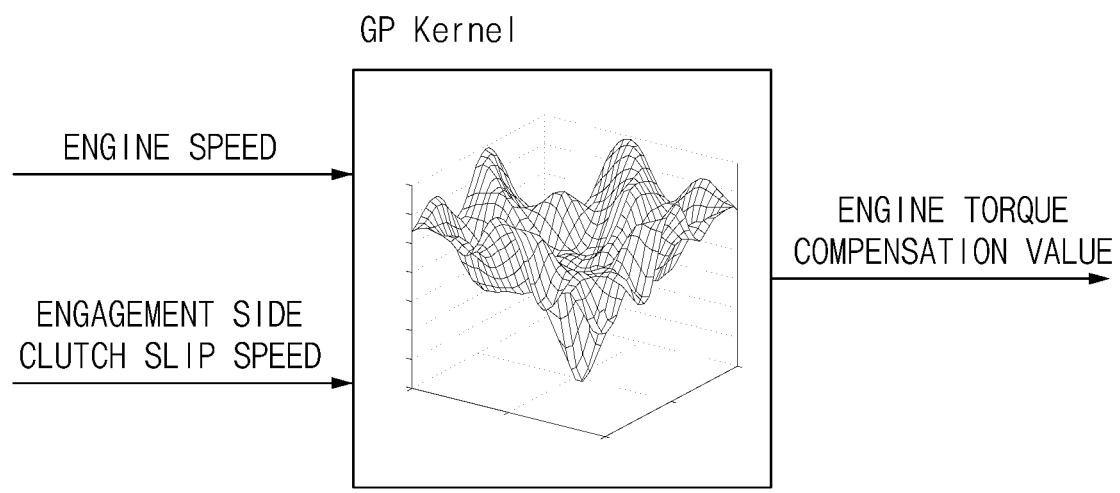
FIG. 3B is a view exemplarily illustrating a GP model provided in an apparatus of controlling a transmission of a vehicle according to an exemplary embodiment of the present disclosure.

FIG. 3A is a view exemplarily illustrating a DCT dynamic model provided in an apparatus of controlling a transmission of a vehicle according to an exemplary embodiment of the present disclosure.

As shown in FIG. 3A, the baseline model representing the DCT dynamic model provided in an apparatus of controlling a transmission of a vehicle according to an exemplary embodiment of the present disclosure may be used while being divided into a torque phase and an inertia phase. In the torque phase, the baseline model requires the release-side clutch torque and the engagement-side clutch torque, whereas in the inertia phase, the baseline model requires the engagement-side clutch torque because the release-side clutch torque is 0 (zero).

In FIG. 3A, $J_{in}$ denotes the moment of inertia of an engine, $\omega_{in}$ denotes an engine speed, $T_{in}$ denotes an engine torque, $b_{in}$ denotes an engine damping coefficient, $T_{c1}$ denotes a release-side clutch torque, $T_{c2}$ denotes an engagement-side clutch torque, $J_{eq}$ denotes a DCT equivalent moment of inertia, $\omega_o$ denotes a DCT output-side speed, $\gamma_1$ denotes an odd gear ratio, $\gamma_2$ denotes an even gear ratio, $\gamma_f$ denotes a final reduction gear ratio, $J_v$ denotes a vehicle equivalent moment of inertia, $\omega_w$ denotes a wheel speed, $J_v$ denotes a vehicle equivalent moment of inertia, $\omega_w$ denotes a wheel speed, $T_s$ denotes a driveshaft torque, $b_w$ denotes a vehicle damping factor, $T_{load}$ denotes a load torque, $J_{eq}^{tp}$ denotes a DCT equivalent moment of inertia in a torque phase, $\omega_{c1}$ denotes a rotation speed of a release-side clutch, $J_{eq}^{ip}$ denotes a DCT equivalent moment of inertia in an inertia phase, $\omega$ c2 is the rotation speed of the engagement-side clutch, and the dot (•) operation denotes a differential value with respect to time. In the instant case, $T_{c1}$ and $T_{c2}$ may be modeled values (model torque values).

The DCT dynamic model may receive the engine torque and the rotation speed of the engagement-side clutch in the inertia phase, and output the engine speed, the rotation speed of the engagement-side clutch and the wheel speed corresponding to them.

FIG. 3B is a view exemplarily illustrating a GP model provided in an apparatus of controlling a transmission of a vehicle according to an exemplary embodiment of the present disclosure.

As shown in FIG. 3B, the machine learning-based GP model may receive the engine speed output from the DCT dynamic model, and the slip speed of the engagement-side clutch determined based on the engine speed output from the DCT dynamic model and the rotation speed of the engagement-side clutch, and output the engine torque (reference engine torque) corresponding to them.

The set values of the machine learning-based GP model are shown in following Table 1 as an example.

TABLE 1

| Item | Set value |
| --- | --- |
| Sampling Point | Ngp |
| Mean function | zero-mean type |

TABLE 1-continued

| Item | Set value |
| --- | --- |
| Covariance function (Kernel type) | Squared Exponential Automatic Relevance Determination |
| Uncertainty propagation | Taylor approximation |

In Table 1, the Ngp value is a natural number and may vary depending on the output range of the engine 10 and the number of shifting stages. For example, the Ngp value may be '4'.

Meanwhile, the storage 11 may store the gear ratio for each gear stage of the vehicle.

The storage 11 may store a target value for a state variable for each predicted time in the future. In the instant case, the prediction time may be expressed as 'sampling time×N (natural number)'. For example, the sampling time is 10 ms and N=4, the future prediction time is 40 ms.

The storage 11 may store a weight 'P' added to the N-th stage error for each state variable, a weight 'Q' added to the errors from this to the (N−1)-th stage for each state variable, and weight 'R' added to the control input (the change amount of the engine torque and the change amount of the engagement-side clutch torque) from this to the (N−1)-th stage. In the instant case, the error may be made smaller as the value of the weight 'Q' increases, and the control input may be made smaller as the value of the weight 'R' increases. The weight 'P' may be set to the same value as the weight 'Q' for control stability.

The storage 11 may include at least one type of a storage medium of memories of a flash memory type, a hard disk type, a micro type, a card type (e.g., a secure digital (SD) card or an extreme digital (XD) card), and the like, and a random access memory (RAM), a static RAM, a read-only memory (ROM), a programmable ROM (PROM), an electrically erasable PROM (EEPROM), a magnetic memory (MRAM), a magnetic disk, and an optical disk type memory.

As shown in FIG. 1, the sensor 12 may include the wheel speed sensor 140, the engine sensor 170, the gear sensor 190, and the clutch sensor 230.

The controller 13 may perform overall control such that each component performs its function. The controller 13 may be implemented in a form of hardware or software, or may be implemented in a combination of hardware and software. The controller 13 may be implemented as a microprocessor, but is not limited thereto.

The controller 13 may perform various controls required in the processes of detecting an engine torque used for optimal shifting based on a DCT dynamic model, predicting an engine torque compensation value based on a GP model, and controlling the shifting of the vehicle based on the engine torque compensated by the engine torque compensation value.

Hereinafter, the operation of the controller 13 will be described in detail with reference to FIG. 4.

Figure 4:
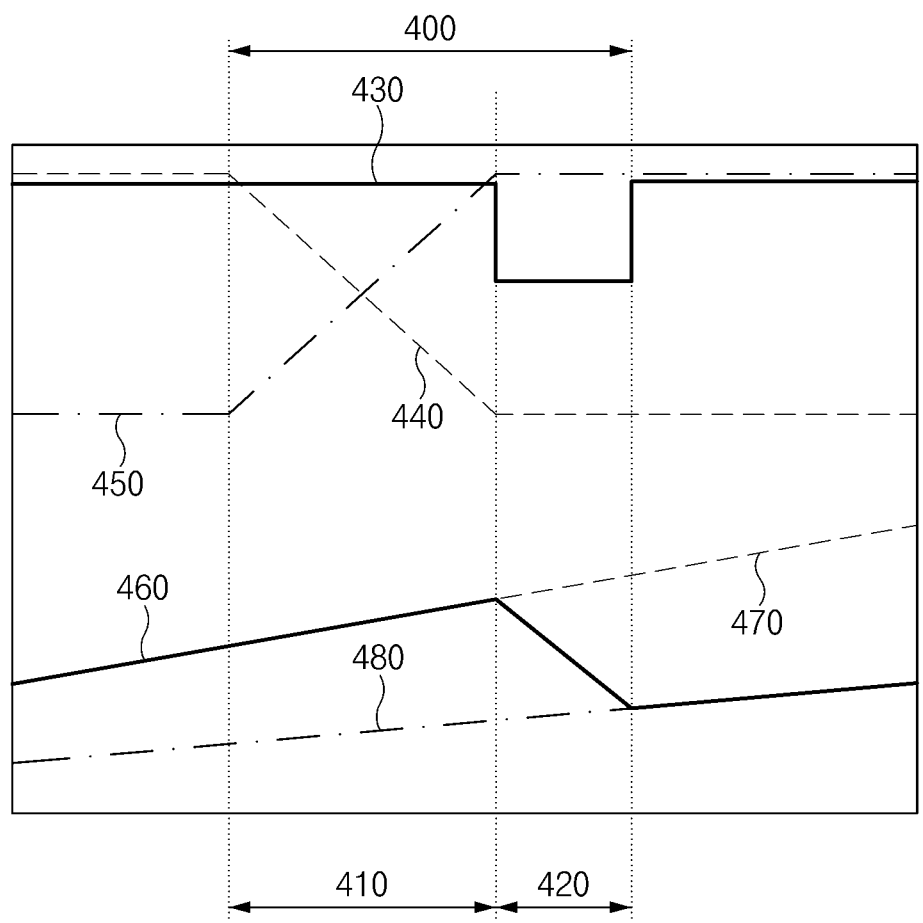
FIG. 4 is a view exemplarily illustrating a section in which a controller provided in an apparatus of controlling a transmission of a vehicle according to an exemplary embodiment of the present disclosure controls the shift of the vehicle.

FIG. 4 is a view exemplarily illustrating a section in which a controller provided in an apparatus of controlling a transmission of a vehicle according to an exemplary embodiment of the present disclosure controls the shift of the vehicle, where the section is a shift section in a process of shifting from stage 1 to stage 2.

In FIG. 4, reference numeral 400 denotes the entire shift section, reference numeral 410 denotes a torque phase within the entire shift section 400, and reference numeral 420 denotes an inertia phase within the entire shift section 400.

Furthermore, reference numeral 430 denotes an engine torque, reference numeral 440 denotes a release-side clutch torque, reference numeral 450 denotes an engagement-side clutch torque, reference numeral 460 denotes an engine speed, reference numeral 470 denotes a release-side clutch speed, and reference numeral 480 denotes an engagement-side clutch speed.

The controller 13 may improve the shift quality by adjusting the engine torque and the engagement-side clutch torque in the inertia section 420.

The controller 13 may input the engine torque and the engagement-side clutch torque to the DCT dynamic model, and may obtain the engine torque, the engine speed, the rotation speed of the engagement-side clutch, and the wheel speed as outputs of the DCT dynamic model. In the instant case, the engine torque output from the DCT dynamic model may have the same value as that of the engine torque input to the DCT dynamic model.

The controller 13 may determine the slip speed of the engagement-side clutch based on the difference between the engine speed and the engagement-side clutch speed. For example, the controller 13 may determine the slip speed of the engagement-side clutch by subtracting the engagement-side clutch speed from the engine speed.

The controller 13 may input the engine speed output from the DCT dynamic model and the determined slip speed of the engagement-side clutch to the machine learning-based GP model, and obtain an engine torque compensation value as an output of the machine learning-based GP model.

The controller 13 may compensate the engine torque output from the DCT dynamic model with the engine torque compensation value output from the machine learning-based GP model, and control the shifting of the vehicle based on the compensated engine torque.

The controller 13 may continuously learn the machine learning-based GP model based on the engine torque input to the DCT dynamic model, the engine speed output from the DCT dynamic model, and the determined slip speed of the engagement-side clutch.

Meanwhile, the controller 13 may determine the input shaft speed of the transmission 30 based on the wheel speed detected by the wheel speed sensor 140 and the gear ratio corresponding to the current gear stage detected by the gear sensor 190. In the instant case, the controller 13 may determine the input shaft speed of the transmission 30, for example, by multiplying the wheel speed by the gear ratio.

The controller 13 may determine the torsion angle of the driveshaft based on the wheel speed detected by the wheel speed sensor 140 and the clutch speed detected by the clutch sensor 230. In the instant case, the controller 13 may determine the torsion angle of the driveshaft, for example, by integrating the difference between the wheel speed and the clutch speed.

The controller 13 may obtain a solution of the model predictive control (MPC) optimization problem based on the DCT dynamic model and the machine learning-based GP model, detecting the change amount of the engine torque (the value obtained by differentiating the engine torque with respect to time) used for the optimal shifting and the change amount of the engagement-side clutch torque (the value obtained by differentiating the engagement-side clutch torque with respect to time). In the instant case, the MPC optimization problem is expressed as following Equation 1.

$$\min_{u} \mathbb{E}\big((x_N - r_N)^T P(x_N - r_N) + \sum_{i=0}^{N-1} \{(x_i - r_i)^T Q(x_i - r_i) + u_i^T R u_i\}\big)$$ [Equation 1]

Where 'x' represents the engine speed, the slip speed of the engagement-side clutch, the wheel speed, the torsion angle of the driveshaft, the engine torque, the engagement-side clutch torque (e.g., the model torque value) as a state variable, and 'r' represents the target value (set value) for the state variable for each prediction time in future, and 'u' represents the change amount of the engine torque and the change amount of the engagement-side clutch torque. In the instant case, an effective range (minimum value and maximum value) of each state variable may be determined.

Furthermore, the prediction time may be expressed as 'sampling time×N (a natural number)'. For example, when the sampling time is 10 ms and N=4, the future prediction time is 40 ms. Furthermore, 'P' denotes a weight added to the N-th stage error for each state variable, 'Q' denotes a weight added to the error from this to the (N−1)-th stage for each state variable, and 'R' denotes a weight added to the control input (the change amount of the engine torque and the change amount of the engagement-side clutch torque) from this to the (N−1)-th stage.

Figure 5:
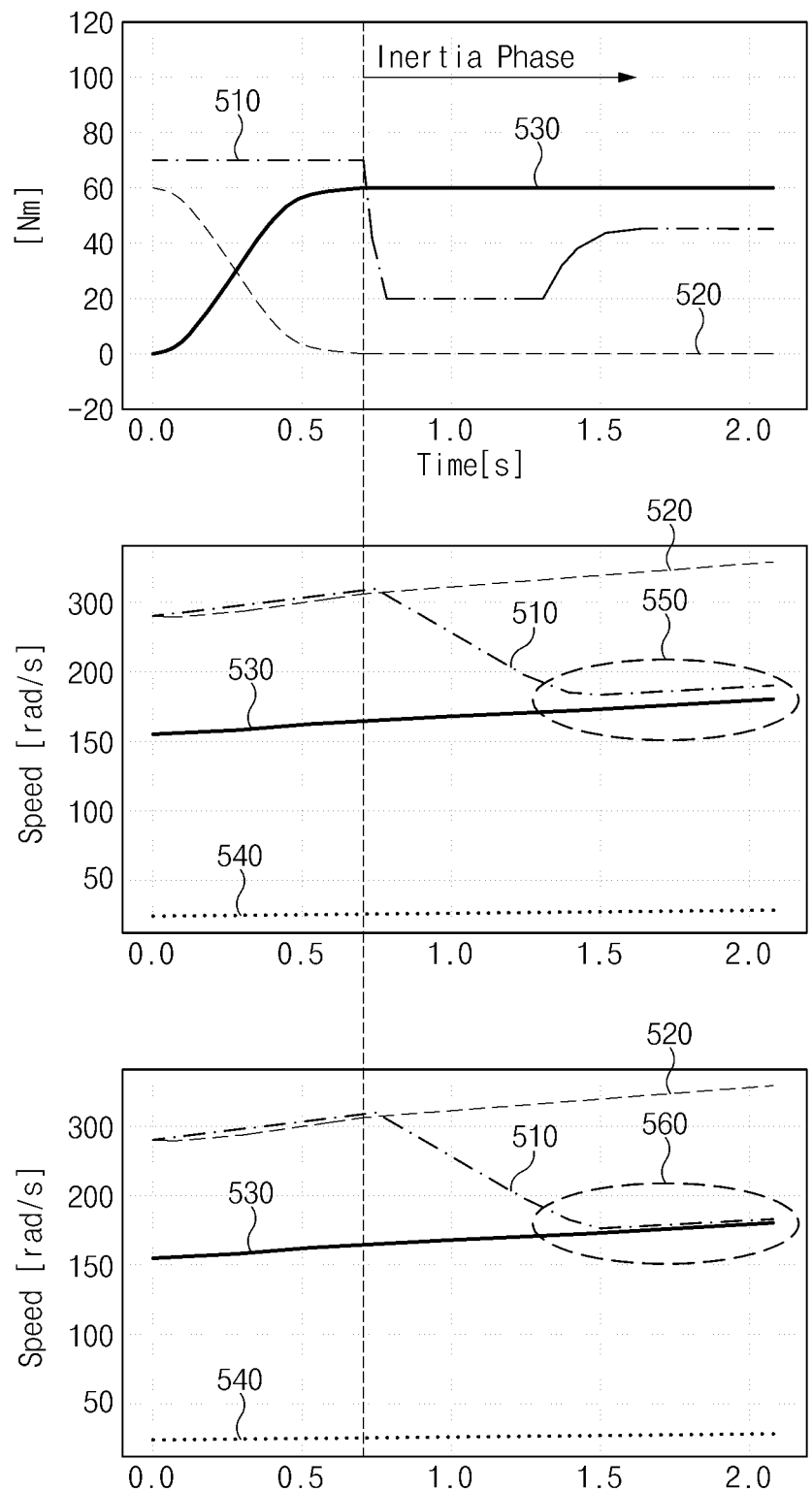
FIG. 5 is a view exemplarily illustrating the performance of an apparatus of controlling a transmission of a vehicle according to an exemplary embodiment of the present disclosure.

FIG. 5 is a view exemplarily illustrating the performance of an apparatus of controlling a transmission of a vehicle according to an exemplary embodiment of the present disclosure.

In FIG. 5, reference numeral 510 indicates an engine torque, reference numeral 520 indicates a release-side clutch torque, reference numeral 530 indicates an engagement-side clutch torque, and reference numeral 540 indicates an output side speed of DCT.

When the controller 13 controls the shifting of the vehicle by use of only the DCT dynamic model, as indicated by reference numeral 550, it may be understood that an engine speed 510 is not synchronized with a rotation speed 530 of the engagement-side clutch.

To the contrary, when the controller 13 controls the shifting of the vehicle by use of the DCT dynamic model and the machine learning-based GP model that assists the DCT dynamic model, as indicated by reference numeral 560, it may be understood that the engine speed 510 is precisely synchronized with the rotation speed 530 of the engagement-side clutch.

As a result, because an apparatus of controlling a transmission of a vehicle according to an exemplary embodiment of the present disclosure controls the shifting of the vehicle by use of the DCT dynamic model and the machine learning-based GP model supporting the DCT dynamic model, the engine speed 510 may be precisely synchronized with the rotation speeds 530 of the engagement-side clutch, so that it is possible to minimize a jerk occurring in a process of shifting of the vehicle, improving shift quality.

Figure 6:
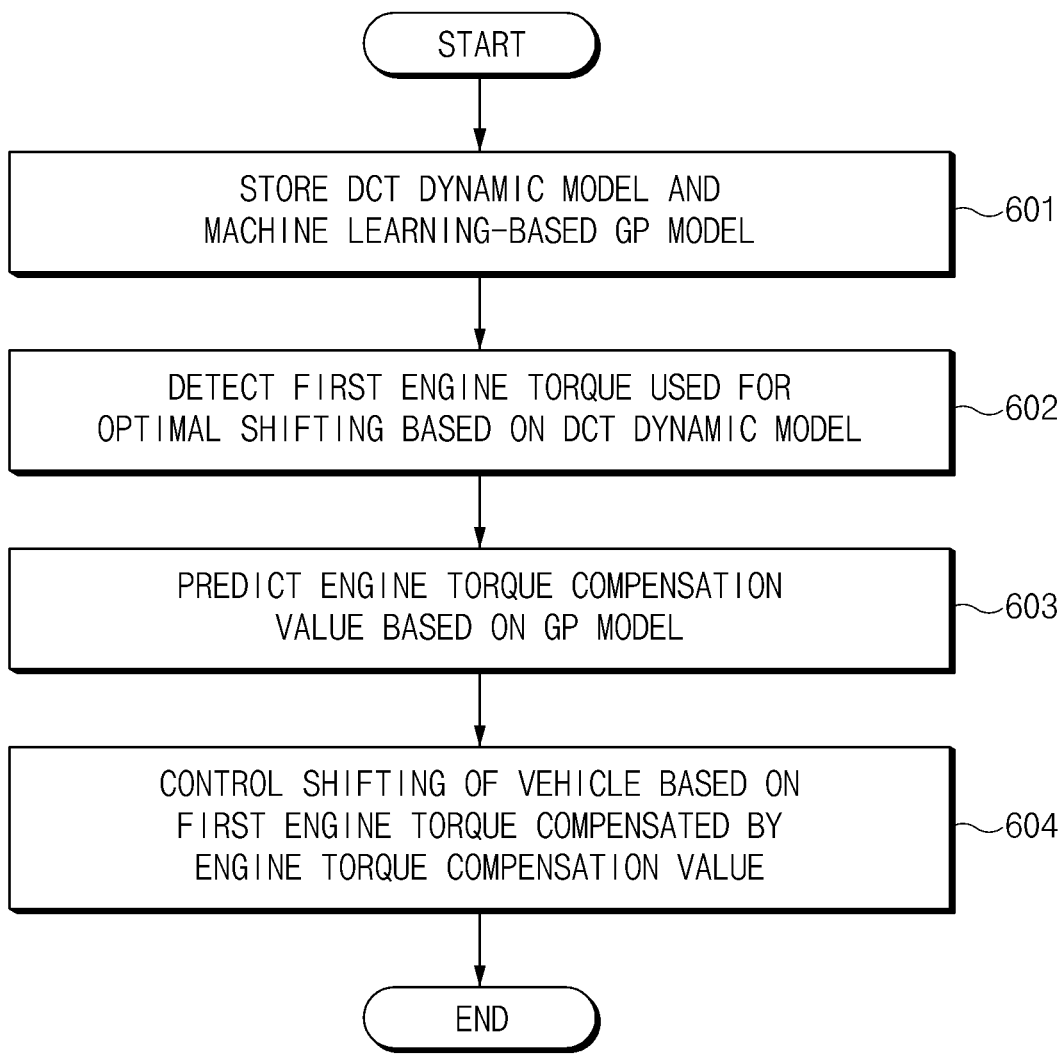
FIG. 6 is a flowchart illustrating a method of controlling a transmission of a vehicle according to an exemplary embodiment of the present disclosure.

FIG. 6 is a flowchart illustrating a method of controlling a transmission of a vehicle according to an exemplary embodiment of the present disclosure.

First, in 601, the storage 11 stores the DCT dynamic model and the machine learning-based GP model.

Then, in 602, the controller 13 detects a first engine torque used for optimal shifting according to the DCT dynamic model.

Then, in 603, the controller 13 predicts an engine torque compensation value according to the machine learning-based GP model.

Then, in 604, the controller 13 controls the shifting of the vehicle according to the first engine torque compensated by the engine torque compensation value.

Figure 7:
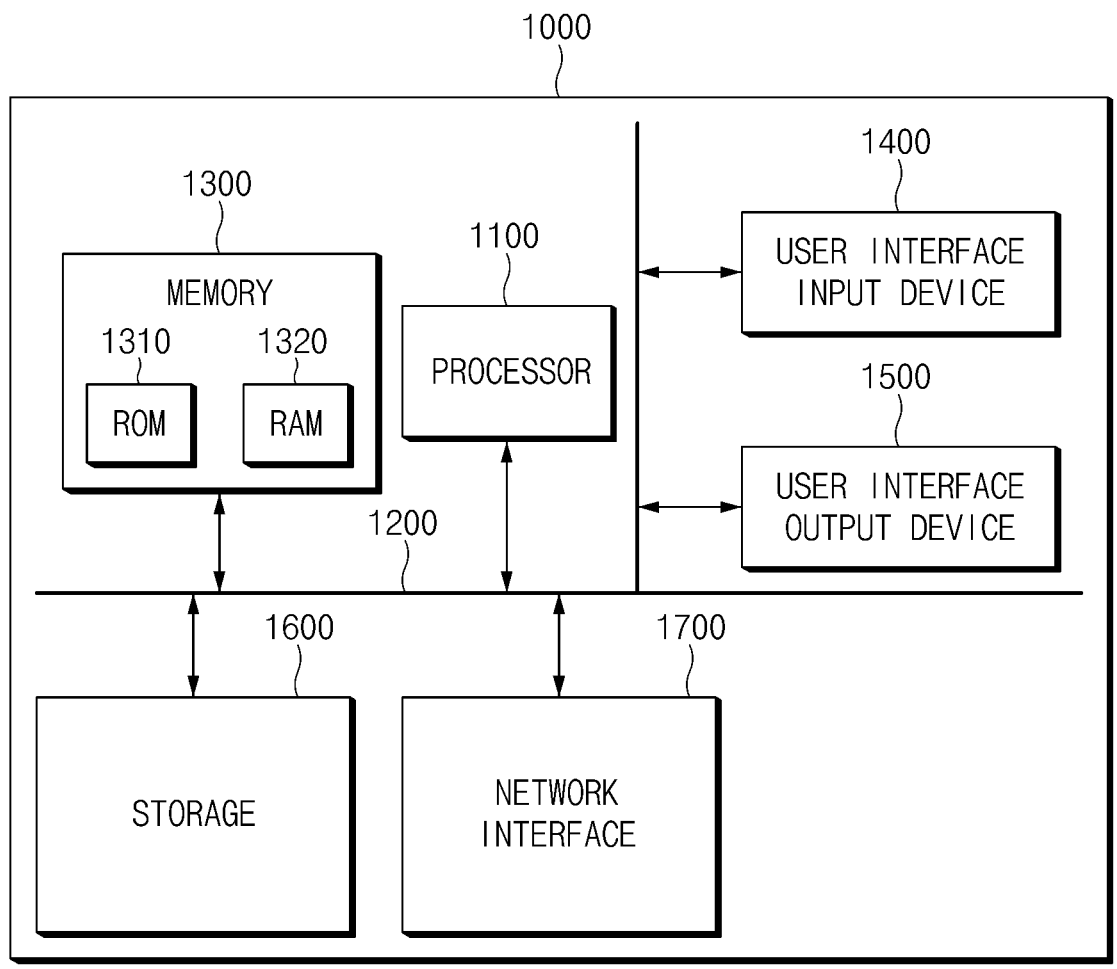
FIG. 7 is a block diagram illustrating a computing system for executing a method of controlling a transmission of a vehicle according to an exemplary embodiment of the present disclosure.

FIG. 7 is a block diagram illustrating a computing system for executing a method of controlling a transmission of a vehicle according to an exemplary embodiment of the present disclosure.

Referring to FIG. 7, a method of controlling a transmission of a vehicle according to an exemplary embodiment of the present disclosure described above may be implemented through a computing system. A computing system 1000 may include at least one processor 1100, a memory 1300, a user interface input device 1400, a user interface output device 1500, storage 1600, and a network interface 1700 connected through a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a Read-Only Memory (ROM) 1310 and a Random Access Memory (RAM) 1320.

Accordingly, the processes of the method or algorithm described in relation to the exemplary embodiments of the present disclosure may be implemented directly by hardware executed by the processor 1100, a software module, or a combination thereof. The software module may reside in a storage medium (that is, the memory 1300 and/or the storage 1600), such as a RAM, a flash memory, a ROM, an EPROM, an EEPROM, a register, a hard disk, solid state drive (SSD), a detachable disk, or a CD-ROM. The exemplary storage medium is coupled to the processor 1100, and the processor 1100 may read information from the storage medium and may write information in the storage medium. In another method, the storage medium may be integrated with the processor 1100. The processor and the storage medium may reside in an application specific integrated circuit (ASIC). The ASIC may reside in a user terminal. In another method, the processor and the storage medium may reside in the user terminal as an individual component.

The apparatus and method for controlling a transmission of a vehicle according to the exemplary embodiments of the present disclosure may minimize a jerk generated during a shift process of the vehicle to improve shift quality by detecting the engine torque used for optimal shifting according to the DCT dynamic model, predicting the engine torque compensation value according to the machine learning-based GP model, and controlling the shifting of the vehicle based on the engine torque compensated by the engine torque compensation value.

Although exemplary embodiments of the present disclosure have been described for illustrative purposes, those skilled in the art will appreciate that various modifications, additions and substitutions are possible, without departing from the scope and spirit of the present disclosure.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of controlling a transmission of a vehicle, the apparatus comprising:
    a storage configured to store a dual clutch transmission (DCT) dynamic model and a machine learning-based Gaussian process (GP) model; and
    a controller configured to determine a first engine torque used for optimal shifting according to the DCT dynamic model, to determine an engine torque compensation value according to the machine learning-based GP model, and to control a shifting of the vehicle according to the first engine torque compensated by the engine torque compensation value.

2. The apparatus of claim 1, wherein the controller is configured to input a second engine torque and an engagement-side clutch torque to the DCT dynamic model, and to obtain the first engine torque, an engine speed, and a rotation speed of an engagement-side clutch as outputs of the DCT dynamic model.

3. The apparatus of claim 2, wherein the controller is configured to determine a slip speed of the engagement-side clutch according to a difference between the engine speed and an engagement-side clutch speed.

4. The apparatus of claim 3, wherein the controller is configured to input the engine speed and the slip speed of the engagement-side clutch to the machine learning-based GP model, and to obtain the engine torque compensation value as an output of the machine learning-based GP model.

5. The apparatus of claim 4, wherein the machine learning-based GP model is configured to output the engine torque compensation value for synchronizing the engine speed with the rotation speed of the engagement-side clutch.

6. The apparatus of claim 3, wherein the controller is configured to learn the machine learning-based GP model based on the second engine torque, the engine speed, and the slip speed of the engagement-side clutch.

7. The apparatus of claim 1, wherein the controller is configured to compensate for the first engine torque by use of the engine torque compensation value in an inertia phase.

8. The apparatus of claim 1, wherein the DCT dynamic model includes a mathematically defined nominal model.

9. The apparatus of claim 1, wherein the machine learning-based GP model includes a mean function which is of a zero-mean type, a covariance function which is a squared exponential automatic relevance determination, and uncertainty propagation which is a Taylor approximation.

10. A method of controlling a transmission of a vehicle, the method comprising:
    storing, by storage, a dual clutch transmission (DCT) dynamic model and a machine learning-based Gaussian process (GP) model;

determining, by a controller, a first engine torque used for optimal shifting according to the DCT dynamic model;

determining, by the controller, an engine torque compensation value according to the machine learning-based GP model; and controlling, by the controller, a shifting of the vehicle according to the first engine torque compensated by the engine torque compensation value.

11. The method of claim 10, wherein the determining of the first engine torque includes:

inputting, by the controller, a second engine torque and an engagement-side clutch torque to the DCT dynamic model; and obtaining, by the controller, the first engine torque, an engine speed, and a rotation speed of an engagement-side clutch as outputs of the DCT dynamic model.

12. The method of claim 11, wherein the determining of the first engine torque includes:

determining, by the controller, a slip speed of the engagement-side clutch according to a difference between the engine speed and an engagement-side clutch speed.

13. The method of claim 12, wherein the determining of the engine torque compensation value includes:

inputting, by the controller, the engine speed and the slip speed of the engagement-side clutch to the machine learning-based GP model; and obtaining, by the controller, the engine torque compensation value as an output of the machine learning-based GP model.

14. The method of claim 13, wherein the machine learning-based GP model is configured to output the engine torque compensation value for synchronizing the engine speed with the rotation speed of the engagement-side clutch.

15. The method of claim 12, further including:

learning, by the controller, the machine learning-based GP model based on the second engine torque, the engine speed, and the slip speed of the engagement-side clutch.

16. The method of claim 10, wherein the controlling of the shifting includes:

compensating, by the controller, for the first engine torque by use of the engine torque compensation value in an inertia phase.

17. The method of claim 10, wherein the DCT dynamic model includes a mathematically defined nominal model.

18. The method of claim 10, wherein the machine learning-based GP model includes a mean function which is of a zero-mean type, a covariance function which is a squared exponential automatic relevance determination, and uncertainty propagation which is a Taylor approximation.

* * * * *